(12) United States Patent
Ehara

(10) Patent No.: US 6,936,374 B2
(45) Date of Patent: Aug. 30, 2005

(54) BATTERY PACK COMPRISING HEAT-SENSITIVE CURRENT BLOCKING ELEMENT AND PRESS PORTION FOR PRESSING THE ELEMENT

(75) Inventor: Yukio Ehara, Kyoto (JP)

(73) Assignee: GS-Melcotec Co., Ltd., Kyoto (JP)

( * ) Notice: Subject to any disclaimer, the term of this patent is extended or adjusted under 35 U.S.C. 154(b) by 385 days.

(21) Appl. No.: 10/118,211

(22) Filed: Apr. 9, 2002

(65) Prior Publication Data

US 2002/0150815 A1 Oct. 17, 2002

(30) Foreign Application Priority Data

Apr. 11, 2001 (JP) ..................................... P.2001-112644

(51) Int. Cl.[7] ............................................. H01M 10/48
(52) U.S. Cl. .............................. 429/90; 429/92; 429/110
(58) Field of Search ............................. 429/90, 92, 110

(56) References Cited

U.S. PATENT DOCUMENTS 5,985,479 A * 11/1999 Boolish et al. ................ 429/56
6,210,824 B1 * 4/2001 Sullivan et al. ............... 429/53

FOREIGN PATENT DOCUMENTS

| JP | 3-190052 A | 8/1991 | |
| JP | 7-122249 A | 5/1995 | |
| JP | 8-162078 A | 6/1996 | |
| JP | 9-167603 | * 6/1997 | ............ H01M/2/08 |

* cited by examiner

*Primary Examiner*—Dah-Wei Yuan
(74) *Attorney, Agent, or Firm*—Sughrue Mion, PLLC

(57) ABSTRACT

The battery pack of the invention comprises an outer case, a battery main body disposed within the outer case, and a heat-sensitive current blocking element mounted on the outer surface of the battery main body. On the inner surface of the outer case is provided a press portion for pressing the heat-sensitive current blocking element against the outer surface of the battery main body. In this arrangement, even when the battery pack is given vibration or impact, the heat-sensitive current blocking element can be kept retained in close contact with the outer surface of the battery main body. Accordingly, the heat generated in the battery main body can be rapidly and surely transferred to the heat-sensitive current blocking element, making sure that thermal runaway of the battery is prevented.

10 Claims, 4 Drawing Sheets

BATTERY PACK COMPRISING HEAT-SENSITIVE CURRENT BLOCKING ELEMENT AND PRESS PORTION FOR PRESSING THE ELEMENT

FIELD OF THE INVENTION

The present invention relates to a battery pack.

BACKGROUND OF THE INVENTION

Examples of the overcharge-preventive mechanism for battery pack comprising a lithium ion secondary battery (hereinafter simply referred to as "battery") having a high energy density include those equipped with a heat-sensitive current blocking element for sensing the temperature rise of the battery to restrict the current flow.

The heat-sensitive current blocking element is normally mounted interposed between lead wires provided on the outer surface of the main body of the battery. When overcharging or the like occurs with abnormal heat generation in the battery, the heat-sensitive current blocking element senses the heat to block or reduce the current flow in the lead wires, making it possible to prevent thermal runaway of the battery.

Specific examples of such a heat-sensitive current blocking element include PTC (Positive Temperature Coefficient) element, thermal fuse, and bimetal device. The PTC element comprises a resistor having a positive temperature coefficient such that the resistivity thereof rises as the temperature rises. When the temperature reaches to the predetermined level, the PTC element shows a sudden rise to restrict the current flow. A thermal fuse comprises a lead wire made of a low melting alloy incorporated therein which melts at a relatively low temperature. When the temperature reaches to the predetermined level, this lead wire fuses to block the current flow. A bimetal device comprises a laminate of two sheets of metal plate having different expansion coefficients and contact point. When the temperature reaches to the predetermined level, the two sheets of metal plate move away from contact point to block the current flow.

In order to assure the operation of the heat-sensitive current blocking element, it is necessary that the rise of the temperature in the battery be transferred to the heat-sensitive current element rapidly and surely. To this end, the heat-sensitive current blocking element is normally mounted in close contact with the outer surface of the main body of battery.

However, when the battery pack undergoes an impact developed by vibration or caused when it drops, the heat-sensitive current blocking element can be separated from the outer surface of the main body of battery. Under these circumstances, when the temperature in the battery rises, the heat-sensitive current blocking element cannot rapidly sense the heat, causing a delay in the operation of restricting current flow. When this delay increases, the temperature in the battery rises excessively before the current flow is restricted, making it likely that the battery can undergo thermal runaway.

SUMMARY OF THE INVENTION

The battery pack of the invention comprises an outer case, a battery disposed within the interior of the outer case, a heat-sensitive current blocking element mounted on the outer surface of the battery, and a press portion provided on the inner surface of the outer case for pressing the heat-sensitive current blocking element against the outer surface of the battery.

Even when given vibration or impact, the battery pack of the invention can keep the heat-sensitive current blocking element retained in close contact with the outer surface of the main body of battery. In this arrangement, the heat in the main body of battery can be rapidly and surely transferred to the heat-sensitive current blocking element, making sure that the thermal runaway of the battery is prevented.

The press portion of the invention may be a protrusion formed integrally with the outer case or may be a press member formed separately from the outer case and adapted to be mounted on the outer case. In the case where the press portion is formed integrally with the outer case, the press portion can be prevented from deviating in position or dropping from the outer case, making sure that the heat-sensitive current blocking element is retained in close contact with the outer surface of the main body of battery.

In the case where the press portion is a press member formed separately of the outer case, the press member is preferably comprises an elastic member or spring member. These members act to absorb vibration or impact applied to the battery pack, making it possible to prevent the damage of the heat-sensitive current blocking element.

More preferably, the press portion is formed by a material having a lower thermal conductivity than that of the outer case. In this arrangement, the heat generated in the battery can be prevented from being transferred to the outer case through the press portion and then escaping to the exterior of the battery, making sure that the rise of the temperature of the main body of battery is sensed by the heat-sensitive current blocking element.

DETAILED DESCRIPTION OF THE INVENTION

<First Embodiment>

An illustrative example of the first embodiment of the battery pack of the invention will be further described hereinafter with referring to FIGS. 1 and 2.

Figure 1:
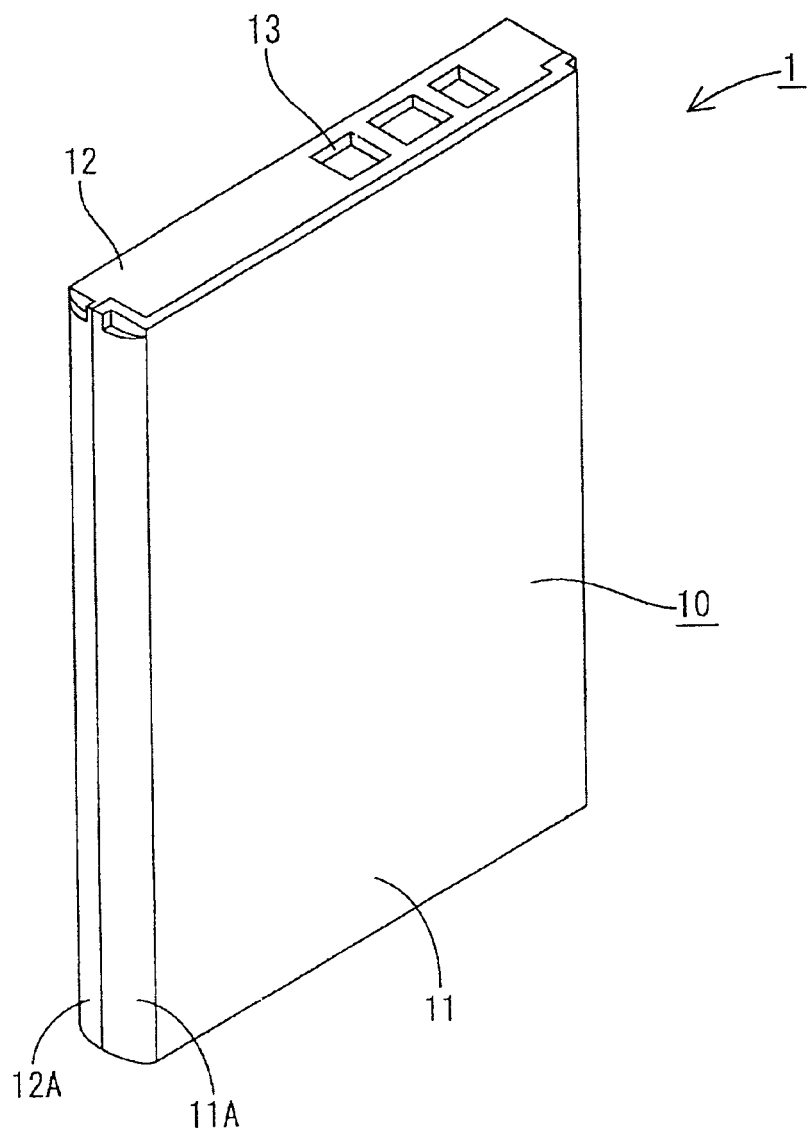
FIG. 1 is a perspective view illustrating a battery pack in complete form.
Figure 2:
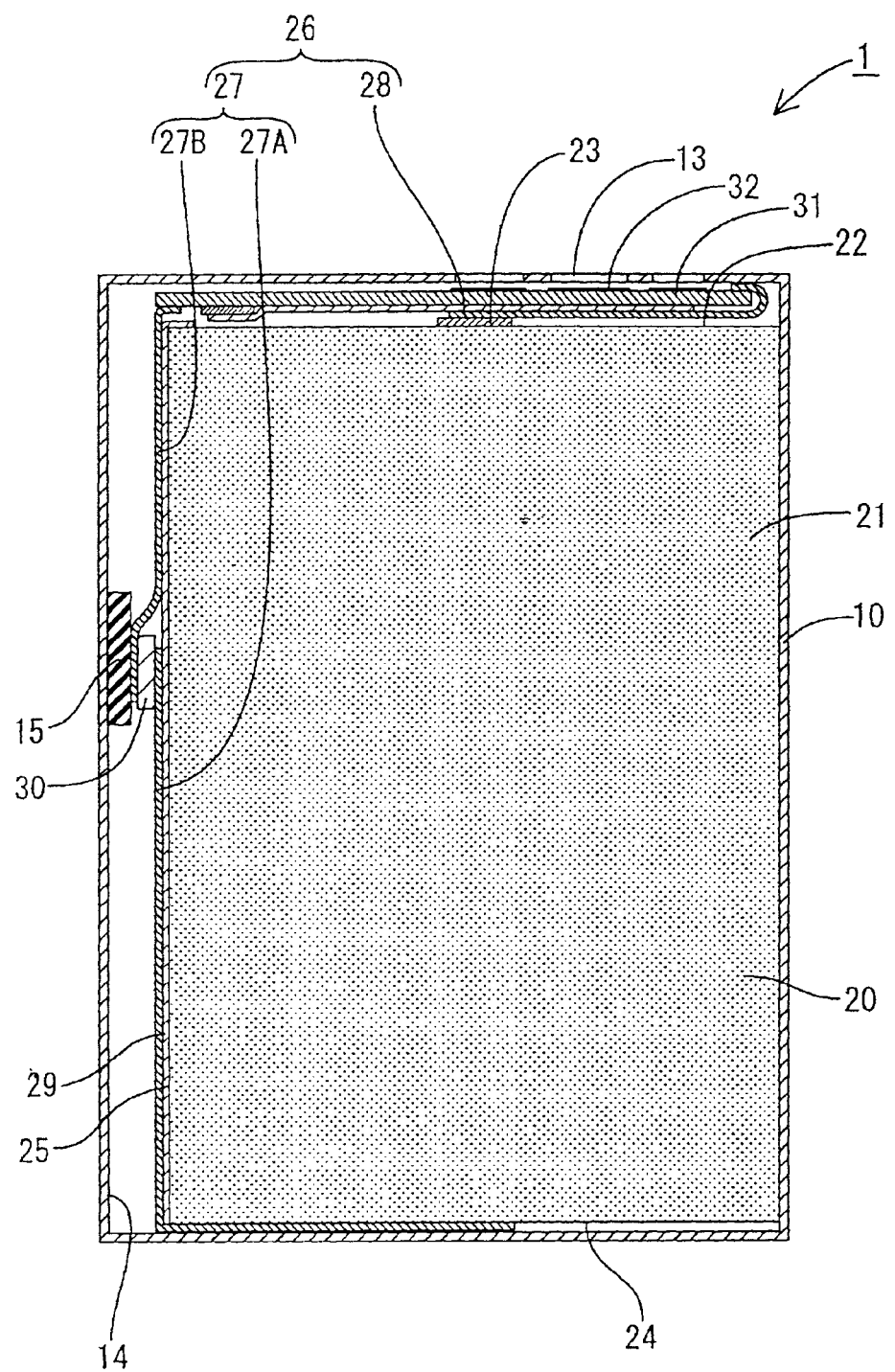
FIG. 2 is a sectional view of a first embodiment of the battery pack.

FIG. 1 illustrates a perspective view of a battery pack 1 of the present embodiment, and FIG. 2 illustrates a sectional view of a battery pack 1 of the present embodiment. The battery pack 1 comprises an outer case 10, a battery 20 disposed within the interior of the outer case 10, a PTC element 30 mounted on the outer surface of the battery 20 (corresponding to the heat-sensitive current blocking element of the invention), and a spacer 15 attached to the inner surface 14 of the outer case 10 (corresponding to the press portion of the invention).

The outer case 10 of the battery pack 1 is formed in a generally flat box and is formed by combining a case portion 11 which is divided into two substantially equal vertical parts and a cover portion 12.

The case portion 11 is formed by a polycarbonate resin in a flat box form in which the battery 20 can be received. On the other hand, the cover portion 12 is formed by a polycarbonate resin in a flat box form which engages with to the case portion 11 and thus can be fitted in the case portion 11 to cover the battery 20. The side wall portion 11A of the case portion 11 and the side wall portion 12A of the cover portion 12 are each formed so as to fit in the their mating part. The side wall portions are ultrasonic-welded to each other at the mating area.

The battery 20 to be disposed within the interior of the battery pack 1 is a prismatic lithium ion secondary battery. The battery 20 comprises a battery can 21 formed by aluminum in a closed-end prismatic container. In the interior of the battery can 21 is received an electricity-generating element. The battery can 21 is also filled with an electrolyte. The opening of the battery can 21 is closed by covering with a cover portion. To the cover portion is fixed a negative electrode terminal 23 with an insulating packing interposed therebetween.

Though not shown in detail, the electricity-generating element is formed by laminating a positive electrode in a continuous length and a negative electrode in a continuous length each having an active material layer formed on both sides thereof with a separator interposed therebetween, and then winding the laminate. In the positive and negative electrodes thus wound, each exposed outermost periphery has no active material layer formed thereon and comes in contact with the inner surface of the battery can 21. From the positive electrode is drawn a positive electrode lead which is caulked to a current collecting washer welded to the cover portion. On the other hand, from the negative electrode is drawn a negative electrode lead which is caulked to the current collecting washer of the negative electrode terminal 23.

To the battery 20 is connected a protective circuit board 31 for preventing overcharging or overdischarging. The protective circuit board 31 comprises predetermined electronic parts packaged on and an external terminal 32 for connecting to the external device provided on a rectangular printed circuit board having almost the same size as that of the cover portion of the battery 20. The protective circuit board 31 is provided opposed to the cover surface 22 of the battery can 21 and is connected to the battery 20 through a lead portion 26. The external terminal 32 is exposed to the exterior through a window portion 13 provided in the outer case 10.

The lead portion 26 is formed by punching a nickel plate and then bending the nickel plate and comprises a positive lead 27 in a longer length and a negative lead 28 in a shorter length. The negative lead 28 is welded to the negative electrode terminal 23 of the battery 20 at one end thereof and is connected to a predetermined position in the protective circuit board 31 at the other.

On the other hand, the positive lead 27 is formed by two lead pieces 27A, 27B formed by a nickel plate in a belt form. The two lead pieces 27A, 27B are connected to each other with the PTC element 30 at ends thereof to form a belt in a longer length, and the lead piece 27A, which is one of the two lead pieces, is bent at a substantially central position thereof to give a generally L-formed shape. The positive lead 27 extends along the bottom surface 24 and the side surface 25 of the battery 20 (corresponding to the outer surface of the invention) and is bonded to the battery 20 with an insulating adhesive tape 29. The end of the positive lead 27 provided at the bottom surface 24 of the battery 20 is spot-welded an Al/Ni cladding material provided on the bottom surface of the battery can 21. The Al/Ni cladding material is fixed to the bottom surface of the battery can 21 with the Al surface thereof facing toward the battery can 21.

The positive lead 27 is connected to the Ni surface, which faces toward the other side. On the other hand, the other end of the positive lead 27 provided on the side surface 25 of the battery 20 is connected to a predetermined position on the protective circuit board 31.

In the interior of the outer case 10 is provided the spacer 15. The spacer 15 is formed by a rubber (corresponding to the elastic member of the invention) in a rectangular form and is bonded to the inner surface 14 of the outer case 11 with an adhesive opposed to the PTC element 30 attached to the battery 20. The thickness of the spacer 15 is slightly greater than the gap between the inner surface 14 of the outer case 10 and the PTC element 30 attached to the battery 20. In this arrangement, when the battery 20 is disposed within the outer case 10, the PTC element 30 is kept clamped between the spacer 15 and the side surface 25 of the battery 20. In this state, the spacer 15 is kept slightly compressed vertically. The resulting elastic restoring force keeps the PTC element 30 pressed against the side surface 25 of the battery 20.

As the rubber forming the spacer 15 there is used a material having a lower thermal conductivity than the polycarbonate resin forming the outer case 10. In this arrangement, the heat which has been transferred from the battery 20 to the PTC element 30 can be prevented from being transferred to the outer case 10 through the spacer 15 and then escaping to the exterior.

The effects and advantages of the invention having the aforementioned constitution will be described hereinafter.

When the battery pack 1 is normally used, the temperature in the battery 20 is kept within a normal range. At this point, electric current flows normally without being restricted by the PTC element 30.

On the other hand, when abnormal heat generation occurs in the battery 20 due to overcharging or the like, the heat is transferred to the PTC element 30 attached in close contact with the side surface 25 of the battery 20. When the temperature rises beyond a predetermined value, the PTC element 30 shows a sudden rise of resistivity that reduces the current flow. In this manner, the current flowing through the circuit is restricted to a safe level, preventing further temperature rise.

The battery pack 1 may be given vibration or impact due to some factor during its production or use. For example, during the production of the battery pack 1, the battery 20 is disposed within the case portion 11. The cover portion 12 is put on the case portion 11. The case portion 11 and the cover portion 12 are then welded to each other. Since this welding is normally carried out by ultrasonic welding process, the resulting ultrasonic wave gives an impact to the battery pack 1. Also during its use, the battery pack 1 can be given impact when dropped by accident or due to other troubles.

When this vibration or impact causes the lead portion 26 or PTC element 30 to be separated from the side surface 25 of the battery 20, the heat generated in the battery 20 cannot be rapidly transferred to the PTC element 30. This produces a time lag between the time when the temperature in the battery 20 rises beyond a predetermined value and the time when the PTC element 30 senses the heat to restrict the current flowing through the circuit. During this time lag, current flows through the circuit, causing the heat generating reaction in the battery 20 to continue and hence making it likely that the battery can undergo thermal runaway.

In accordance with the present embodiment, however, the outer case 10 has the spacer 15 provided therein. The elastic force of the spacer 15 keeps the PTC element 30 pressed against the side surface 25 of the battery 20. In this arrangement, even when the battery pack 1 is given vibration or impact as mentioned above, the PTC element 30 can be kept retained in close contact with the side surface 25 of the battery 20. Accordingly, the heat generated in the battery 20 can be rapidly and surely transferred to the PTC element 30, making sure that thermal runaway of the battery is prevented.

The spacer 15 is formed by an elastic rubber and thus acts to absorb the vibration or impact applied to the battery pack 1. Accordingly, the damage of the PTC element 30 can be prevented.

Further, as the rubber forming the spacer 15, a material having a lower thermal conductivity than the polycarbonate resin forming the outer case 10 is used. In this arrangement, the heat which has been transferred from the battery 20 to the PTC element 30 can be prevented from being transferred to the outer case 10 through the spacer and then escaping to the exterior. This makes sure that the rise of the temperature in the battery 20 is sensed by the PTC element 30 and hence makes sure that thermal runaway of the battery is prevented.

<Second Embodiment>

Figure 3:
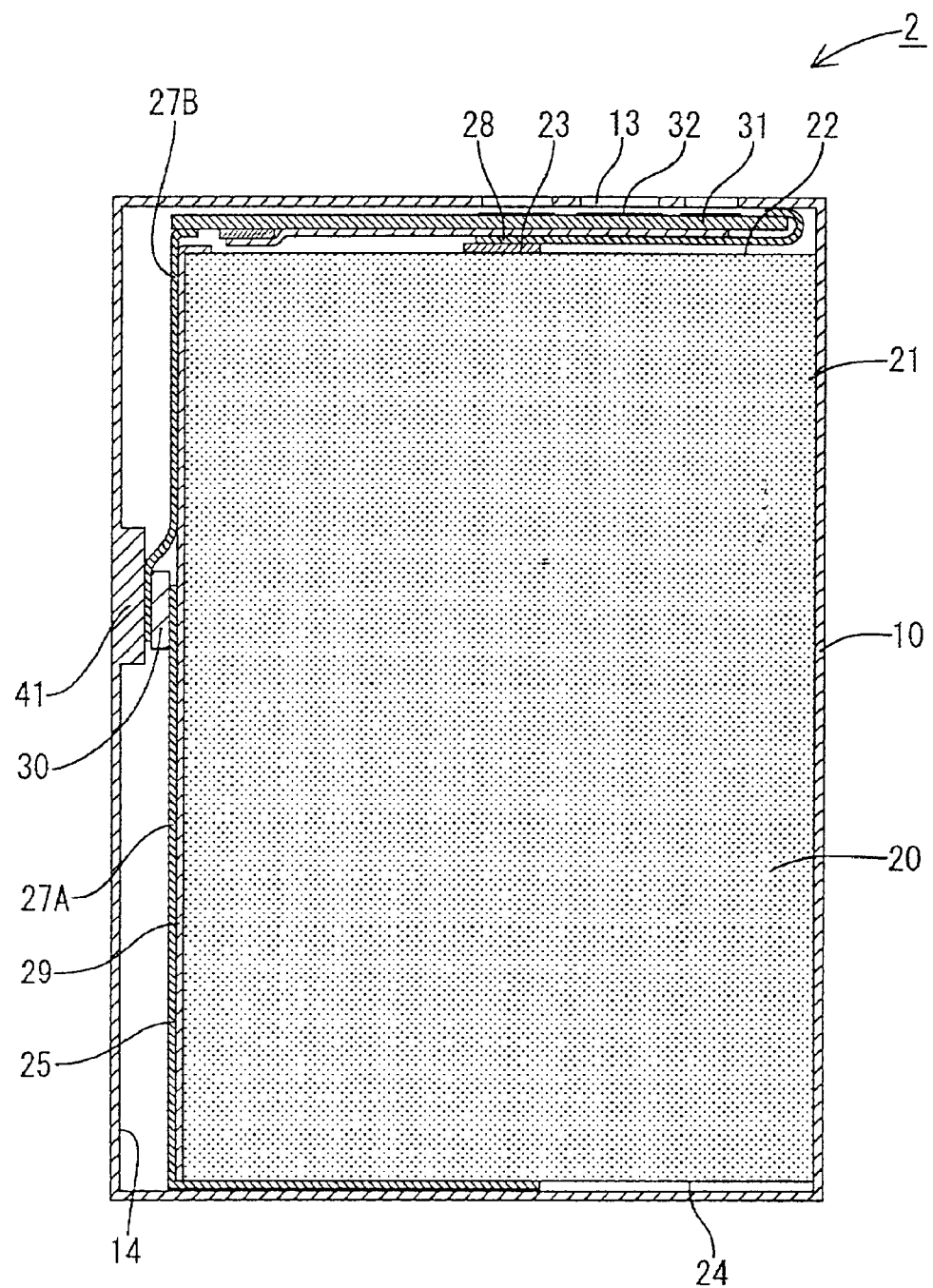
FIG. 3 is a sectional view of a second embodiment of the battery pack.
Figure 4:
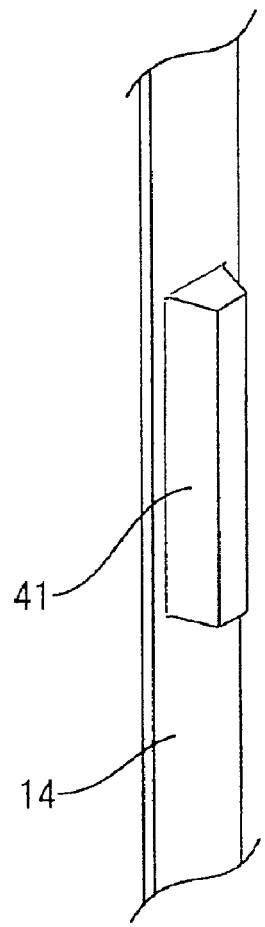
FIG. 4 is an enlarged view illustrating a protrusion in the second embodiment.

An illustrative examples of the second embodiment of the battery pack of the invention will be further described hereinafter with referring to FIGS. 3 and 4. In the present embodiment, the same constitutions as those of the first embodiment will be given the same reference numerals as used in the first embodiment and their description will be omitted.

The battery pack 2 of the present embodiment comprises a battery 20 having the same constitution as used in the first embodiment disposed within an outer case 10 having the same constitution as used in the first embodiment.

The outer case 10 has a rib-shaped protrusion 41 provided therein instead of the spacer 15 in the first embodiment. This protrusion 41 is provided protruding from the inner surface 14 of the outer case 10 opposed to the PTC element 30 attached to the battery 20. The protruding height of the protrusion 41 is almost the same as the gap between the inner surface 14 of the outer case 10 and the PTC element 30. In this arrangement, when the battery 20 is disposed within the outer case 10, the PTC element 30 is kept clamped between the protrusion 41 and the side surface 25 of the battery 20. The pressing force of the protrusion 41 keeps the PTC element 30 pressed against the side surface 25 of the battery 20.

In this arrangement, even when given vibration or impact, the battery pack 2 can keep the FTC element 30 retained in close contact with the side surface 25 of the battery 20 similarly to the first embodiment. Accordingly, the heat generated in the battery 20 can be rapidly and surely transferred to the PTC element 30, making sure that thermal runaway of the battery is prevented. Further, the protrusion 41 is formed integrally with the outer case 10 and thus cannot be deviated in position or dropped unlike the member formed separately of the outer case 10. This makes sure that the PTC element 30 is retained in close contact with the side surface 25 of the battery 20.

<Third Embodiment>

Figure 5:
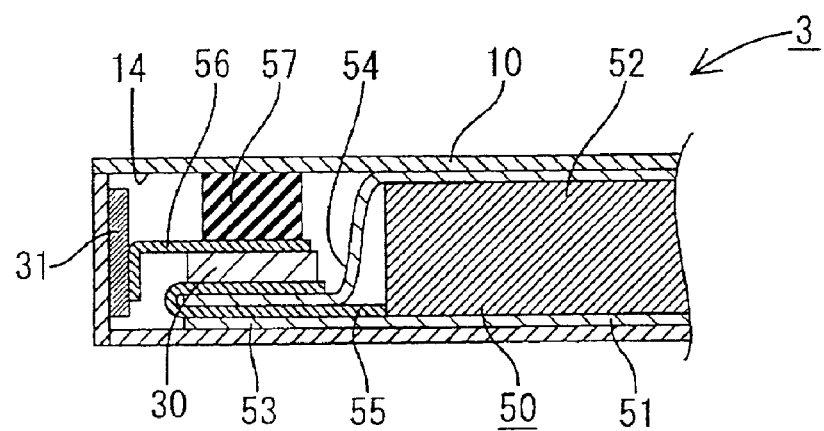
FIG. 5 is a sectional view of a third embodiment of the battery pack.

An illustrative example of the third embodiment of the battery pack of the invention will be further described hereinafter with referring to FIG. 5. In the present embodiment, the same constitutions as those of the first embodiment will be given the same reference numerals as used in the first embodiment and their description will be omitted.

The battery pack 3 of the present embodiment comprises a laminated film type battery 50 disposed within an outer case 10 having the same constitution as used in the first embodiment.

The battery 50 comprises a battery case 51 made of a laminated film and an electricity-generating element 52 disposed within the interior of the battery case 51.

The battery case 51 is a bag formed by bending a laminated film obtained by laminating a polyethylene terephthalate film, an aluminum foil, an adhesive layer, a first modified polyolefin layer and a second modified polyolefin layer in this order with the second modified polyolefin layer inside, and then welding the laminate at the sides thereof. The electricity-generating element 52 and the electrolyte are disposed within the battery case 51 through the opening thereof. Subsequently, the opening of the battery case is closed and heat contact-bonded to seal the battery case 51.

The electricity-generating element 52 is prepared by laminating a positive electrode and a negative electrode with a separator interposed therebetween, and then winding the laminate similarly to the first embodiment. From the positive electrode and the negative electrode are drawn a positive lead and a negative lead, respectively. The forward end of these leads are drawn to the exterior through a sealed portion 53. The forward end of a lead 55 which is one of the positive and negative leads is bent to form a hairpin curve extending along the outer surface 54 of the sealed portion 53 and is connected to one of a lead piece 56 with the PTC element 30 interposed therebetween. The lead piece 56 is a short strip formed by a nickel plate. The other end of the lead piece 56 is connected to a predetermined position on the protective circuit board 31. Though not shown in detail, the forward end of the other lead is connected to a predetermined position on the protective circuit board 31.

The outer case 10 has a spacer 57 provided on the inner surface 14 thereof. Similarly to the first embodiment, the spacer 57 is formed by a rubber in a rectangular form and is connected to the inner surface 14 of the outer case 10 with an adhesive opposed to the PTC element 30 attached to the battery 50. The thickness of the spacer 57 is slightly greater than the gap between the inner surface 14 of the outer case 10 and the PTC element 30. In this arrangement, when the battery 50 is disposed within the outer case 10, the PTC element 30 is kept clamped between the spacer 57 and the sealed portion 53 of the battery 50. At this point, the spacer 57 is kept slightly compressed vertically. The resulting elastic restoring force keeps the PTC element 30 pressed against the outer surface 54 of the sealed portion 53.

In this arrangement, even when given vibration or impact, the battery pack 3 can keep the PTC element 30 retained in close contact with the outer surface 54 of the sealed portion 53. Accordingly, the heat generated in the battery 50 can be rapidly and surely transferred to the PTC element 30, making sure that thermal runaway of the battery is prevented, similarly to the first embodiment.

At the sealed portion 53 of the battery 50, the opening of the bag-shaped battery case 51 is closed and heat contact-bonded. The thickness of the sealed portion is smaller than that of the portion where the electricity-generating element 52 is received. Accordingly, when the battery 50 is disposed within the outer case 10, a space exists between the inner surface 14 of the outer case 10 and the outer surface 54 of the sealed portion 53. In the space are provided the PTC element 30 and the spacer 57. In this arrangement, the inner space of the outer case 10 can be effectively utilized, making it possible to miniaturize the entire battery pack 3.

The technical scope of the invention is not restricted by the aforementioned embodiments. The following constitutions are included in the technical scope of the invention.

(1) While the aforementioned embodiments have been described with reference to the case where as a heat-sensitive current blocking element there is used PTC element 30, the kind of the heat-sensitive current blocking element is not limited to the aforementioned embodiments according to the invention. For example, a thermal fuse, bimetal device, etc. may be used.

(2) While the first embodiment has been described with reference to the case where a spacer 15 made of rubber is used as an elastic member, the kind of the press member is not limited to the first embodiment. For example, a leaf spring, spring coil, etc. may be used.

(3) While the first and third embodiments have been described with reference to the case where the spacers 15, 57 are bonded to the inner surface 14 of the outer case 10, the press member does not necessarily need to be bonded to the inner surface of the outer case 10 according to the invention. These spacers may be merely clamped between the inner surface of the outer case 10 and the heat-sensitive current blocking element.

(4) While the first and third embodiments have been described with reference to the case where the spacers 15, 57 each are an elastic member formed by a rubber material having a lower thermal conductivity than that of the polycarbonate resin forming the outer case 10, the press member does not necessarily need to be formed by an elastic member according to the invention. For example, these spacers may be formed by a synthetic resin. Alternatively, these spacers does not necessarily need to be formed by a material having a lower thermal conductivity than that of the outer case. For example, these spacers may be formed by the same material as that of the outer case.

(5) While the second embodiment has been described with reference to the case where the protrusion 41 is in a rib form, the shape of the protrusion is not limited to the second embodiment according to the invention. For Example, the protrusion may be in the form of column.

(6) While the various embodiments have been described with reference to the case where the number of the spacers 15 and 57 and the protrusion 41 each are only one, the number of press members is not limited to these embodiments according to the invention. The number of press members may be two or more.

While the invention has been described in detail and with reference to specific embodiments thereof, it will be apparent to one skilled in the art that various changes and modifications can be made therein without departing from the scope thereof.

This application is based on Japanese patent application No. 2001-112644 filed Apr. 11, 2001, the entire contents thereof being hereby incorporated by reference.

What is claimed is:

1. A battery pack comprising the following elements:
an outer case;
a battery comprising a battery case disposed within said outer case;
a heat-sensitive current blocking element mounted on the outer surface of said battery; and
a press portion provided on the inner surface of said outer case for pressing said heat-sensitive current blocking element against the outer surface of said battery.

2. The battery pack according to claim 1, wherein said press portion is an elastic member attached to the inner surface of said outer case.

3. The battery pack according to claim 1, wherein said press portion is a spring member attached to the inner surface of said outer case.

4. The battery pack according to claim 1, wherein said press portion is formed by a material having a lower thermal conductivity than that of said outer case.

5. The battery pack according to claim 2, wherein said press portion is formed by a material having a lower thermal conductivity than that of said outer case.

6. The battery pack according to claim 3, wherein said press portion is formed by a material having a lower thermal conductivity than that of said outer case.

7. The battery pack according to claim 1, wherein said press portion is a protrusion provided on the inner surface of said outer case and formed integrally with said outer case.

8. The battery pack according to claim 1, wherein said battery is a prismatic lithium ion secondary battery.

9. The battery pack according to claim 1, wherein said battery case is made of a laminated film.

10. The battery pack according to claim 9, wherein said battery comprises:
a positive electrode;
a negative electrode;
a lead drawn from said positive electrode or said negative electrode; and
a sealed portion of said battery case;
wherein said lead is bent along an outer surface of said sealed portion and connected to said heat-sensitive current blocking element.

* * * * *